United States Patent [19]

Asakawa

[11] Patent Number: 4,720,354

[45] Date of Patent: Jan. 19, 1988

[54] AROMA COMPOSITION

[75] Inventor: Yoshinori Asakawa, Tokushima, Japan

[73] Assignee: Kuraray Co., Ltd., Kurashiki, Japan

[21] Appl. No.: 798,393

[22] Filed: Nov. 15, 1985

[30] Foreign Application Priority Data

Nov. 20, 1984 [JP] Japan ................................ 59-246764

[51] Int. Cl.[4] ................................................ A01K 7/46

[52] U.S. Cl. ................................ 252/522 R; 426/538; 131/275

[58] Field of Search ...................... 568/374; 252/522 R

[56] References Cited

U.S. PATENT DOCUMENTS 4,359,588 11/1982 Burzin et al. .................. 252/522 R

OTHER PUBLICATIONS

Asakawa et al., Chem. Abst., vol. 94, #188620v (1981).
Bohlmann et al., Chem. Abst., vol. 92, #3499h (1982).
Matsuo et al., J.C.S. Comm., 1979, pp. 174–175 (1979).

*Primary Examiner*—James H. Reamer
*Attorney, Agent, or Firm*—Oblon, Fisher, Spivak, McClelland & Maier

[57] ABSTRACT

There is provided an aroma composition containing 1,5,8,8-tetramethylbicyclo[8.1.0]undec-5-en-2-one. This sesquiterpene ketone has an aroma reminiscent of a variety of odors based on the strong powdery, woody note and furthermore has high diffusivity and retentivity and accords well with a number of perfume, fragrance and flavor materials.

1 Claim, No Drawings

AROMA COMPOSITION

BACKGROUND OF THE INVENTION

1. Field of the Invention

This invention relates to an aroma composition which contains a certain specific sesquiterpene ketone.

2. Description of the Prior Art

As a fragrance raw material isolable from lichens, there is known the oak moss oil, which is obtained, for example, from Evernia prunastri, a kind of lichen growing on oak. The oil is used as a fixer for perfume and fragrances of the chypre or fougère type, for instance.

It is reported that 1,5,8,8-tetramethylbicyclo[8.1.0]undec-5-en-2-one was isolated from a species of liverworts, *Plagiochila acanthophylla* subsp. *japonica.* [This sesquiterpene ketone is called "bicyclohumulenone"; cf. H. Nozaki et al., J.C.S. Chem. Comm., 1979, pages 174–175.]

Furthermore, it is known that muscone (3-methylcyclopentadecanone-1) and cyclopentadecanone have a musk-like odor and that civetone (cycloheptadecen-9-one-1) has a civet-like odor. These macrocyclic ketones are used as fixers in perfume and fragrance formulations.

An object of the invention is to provide the use, as a perfume or fragrance or flavor material, of a certain sesquiterpene ketone having a characteristic odor distinct from the odors of the so-far known macrocyclic ketones.

This object as well as other objects and advantages of the invention will become apparent to those skilled in the art from the following detailed description.

SUMMARY OF THE INVENTION

This invention provides an aroma composition which contains bicyclohumulenone.

DETAILED DESCRIPTION OF THE INVENTION

The above-mentioned liverwort *Plagiochila acanthophylla* subsp. *japonica,* which contains bicyclohumulenone, belongs to the family Plagiochilaceae of the order Jungermanniales, is a cormus liverwort growing on a moist rock bed and can be collected easily. Said liverwort is widely distributed all over Japan, in the Korean Peninsula and in Formosa, among others, so that it is possible to secure it in a sufficient quantity for use as a raw material on a commercial scale.

Bicyclohumulenone can be obtained, for example, by extracting dried and ground *Plagiochila acanthophylla* subsp. *japonica* with a solvent such as an ether (e.g. diethyl ether, dibutyl ether), a halogenated hydrocarbon (e.g. methylene chloride, chloroform, dichloroethane) or an alcohol (e.g. methanol, ethanol, isopropyl alcohol). The extraction is generally conducted at a temperature of about 10°–40° C. over about 2–14 days. Removal of the solvent from the extract by distillation gives the essential oil of the liverwort *Plagiochila acanthophylla* subsp. *japonica* which contains bicyclohumulenone. Bicyclohumulenone can be isolated in the conventional manner by subjecting said essential oil to distillation or column chromatography. The above-mentioned essential oil can also be obtained by subjecting said liverwort to steam distillation or supercritical extraction with carbon dioxide, which is carried out in the conventional manner. The essential oil obtained by steam distillation can be used directly as a perfume or fragrance or flavor material.

Bicyclohumulenone has an aroma reminiscent of a variety of odors based on the strong powdery, woody note, such as the odors of patchouli, vetiver, cedarwood, orris, moss, carnation, etc. Furthermore, it has high diffusivity and retentivity and accords well with a number of perfume and fragrance materials.

Bicyclohumulenone can be added to perfume and fragrance compositions in its pure form or it can be added to mixtures of materials in fragrance-imparting compositions to provide a desired fragrance character to a finished perfume material. The perfume and fragrance compositions obtained according to this invention are suitable in a wide variety of perfumed articles and can also be used to enhance, modify or reinforce natural fragrance materials. It will thus be appreciated that bicyclohumulenone is useful as an olfactory agent and fragrance.

The term "perfume and fragrance composition" is used herein to mean a mixture of compounds, including, for example, natural oils, synthetic oils, alcohols, aldehydes, ketones, esters, lactones, and frequently hydrocarbons which are admixed so that the combined odors of the individual components produce a pleasant or desired fragrance. Such perfume and fragrance compositions usually contain (a) the main note or the bouquet or foundation-stone of the composition, (b) modifiers which round off and accompany the main note, (c) fixatives which include odorous substances which lend a particular note to the composition throughout all stages of evaporation, and substances which retard evaporation, and (d) top notes which are usually low-boiling fresh-smelling materials. Such perfume and fragrance compositions of this invention can be used in conjunction with carriers, vehicles, solvents, dispersants, emulsifiers, surface-active agents, aerosol propellants and the like.

In perfume and fragrance compositions, the individual components contribute their particular olfactory characteristics, but the overall effect of the perfume and fragrance composition will be the sum of the effect of each ingredient. Thus, bicyclohumulenone can be used to alter the aroma characteristics of a perfume and fragrance composition, for example, by highlighting or moderating the olfactory reaction contributed by another ingredient of the composition.

The perfume and fragrance composition according to this invention contains an olfactorily sensible amount of bicyclohumulenone. The proportion of bicyclohumulenone in the total composition may vary according to the intended use of the composition; for example, it may range from about 0.005 weight percent to 95 weight percent. The perfume and fragrance composition of this invention can be used in a large variety of ways. For example, it can be used as or in soaps; space deodorants; perfumes and eau de cologne; cosmetic preparations such as lotions, creams, etc.; bath supplies such as bath oil, bath salts, etc.; hair preparations such as hair tonics, pomades, hair liquids, hair creams, stick pomades, shampoos, rinses, etc.; cleansers; detergents, etc. In addition, the perfume and fragrance composition can also be used for scenting such substrates as textile fibers and fabrics, paper products and so on.

Bicyclohumulenone is also useful as an ingredient for the preparation of artificial flavors and as flavor additives in foodstuffs, animal feeds, beverages, pharmaceutical preparations and tobacco products. The term "foodstuff" is used in this specification in its broadest sense and is meant to include also products such as coffee, tea and cocoa.

When bicyclohumulenone is used as a flavoring agent or additive for modifying the organoleptic properties of foodstuffs, animal feeds, beverages, pharmaceutical preparations and tobacco products, bicyclohumulenone can be used in proportions from 0.1 to 10 ppm based on the weight of the products to be flavored. However, these proportions can be increased beyond 10 ppm up to about 100 ppm in order to achieve special flavoring effects. In the preparation of flavoring compositions by admixing bicyclohumulenone to other aromatics, bicyclohumulenone can be used, for example, in proportions of about 0.1% to about 15% of the total weight of the flavoring composition. In many cases average proportions of about 1 to 10% by weight will give the desired results.

The above-mentioned aroma composition provided by this invention has a modern and high-quality note which is making the best use of the aroma of bicyclohumulenone.

The following examples are given to merely illustrate this invention in further detail and should by no means be construed as limiting the scope of the invention.

PRODUCTION EXAMPLE

A 450 gram portion of the liverwort *Plagiochila acanthophylla* subsp. *japonica* as freshly collected in Kamiyama-cho, Myozai-gun, Tokushima Prefecture, Japan was ground in a mixer and extracted with two 5 liter portions of methanol at 20° C. over 72 hours. The extract was subjected to suction filtration and the obtained filtrate was concentrated under reduced pressure. The residue was extracted with two 300 ml portions of diethyl ether and one 150 ml portion of water. The ether layer was concentrated under reduced pressure and the residue (13.45 g) was subjected to column chromatography using 200 g of silica gel. Development was attained using the ethyl acetate-n-hexane mixed solvent system while gradually increasing the concentration of ethyl acetate. The 15% ethyl acetate-85% n-hexane eluate fraction was concentrated under reduced pressure and the residue (5.105 g) was subjected to chromatography on a column of 30 g of Sephadex LH-20. Development with a mixed solvent composed of equal volumes of chloroform and methanol gave 3.182 g of a bicyclohumulenone-containing fraction. This fraction was subjected to column chromatography using 100 g of silica gel. Development was attained using the ethyl acetate-benzene mixed solvent system while gradually increasing the concentration of ethyl acetate and, from the 30% ethyl acetate-70% benzene eluate fraction, there was obtained 0.717 g of bicyclohumulenone as crystals. The instrumental analysis data for this compound are given below:

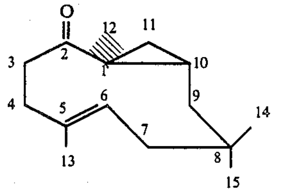

Melting point: 75°-77° C.

Specific rotation $[\alpha]_D^{22}$: +68.5 (c 0.99, $CHCl_3$).

IR spectrum ($cm^{-1}$): 2950, 1680, 1445, 1385, 1360, 1328, 1305, 1165, 1122, 1088, 1065.

UV spectrum [nm (log $\epsilon$)]: 207 (3.70). Mass spectrum (m/z): 220 [M+], 205, 136, 121, 109, 107, 95, 81, 69, 67, 55, 41.

$^1$H-NMR spectrum (400 MHz) $\delta_{ppm}^{CDCl_3}$: 0.26 (dd, J=7.1 Hz and 3.2 Hz, 1H); 0.97 (s, 3H); 1.07, 1.17 (each s, 6H); 1.47 (dd, J=12.4 Hz and 0.5 Hz, 1H); 3.13 (ddd, J=12.2 Hz, 6.37 Hz and 4.88 Hz, 1H); 5.20 (d, J=10.7 Hz, 1H).

$^{13}$C-NMR spectrum (100 MHz) $\delta_{ppm}^{CDCl_3}$: 16.70, 17.21 (C-14, C-15); 24.97 (C-12); 25.52 (C-9); 32.38 (C-10); 33.88 (C-13); 34.34, 34.56 (C-1, C-8); 39.41, 39.47, 39.51, 40.89 (C-11, C-7, C-4, C-3); 125.33 (C-6); 130.18 (C-5); 215.60 (C-2).

EXAMPLE 1

Perfume and fragrance composition of the powdery floral type

A powdery floral base was prepared according to the following formula:

| | Parts by weight |
|---|---|
| Bergamot oil | 10 |
| Neroli oil | 5 |
| Carnation absolute | 3 |
| Clove oil | 5 |
| Aldehyde C-10 MNA 10% | 3 |
| Methyl ionone | 8 |
| Citronellol | 5 |
| Geraniol | 5 |
| Hydroxycitronellal | 8 |
| Rose absolute | 2 |
| Jasmin base | 10 |
| Anisaldehyde | 5 |
| Patchouli oil | 3 |
| Vanillin | 2 |
| Tonka tink | 2 |
| Labdanum oil | 3 |
| Musk ambrette | 5 |
| Sandalwood oil | 5 |
| Civet tink | 3 |
| Bicyclohumulenone | 8 |
| | 100 |

EXAMPLE 2

Perfume and fragrance composition of the oriental bouquet type

A perfume and fragrance composition of the oriental bouquet type was prepared according to the following formula:

| | Parts by weight |
|---|---|
| Orange flower oil | 15 |
| Bergamot oil | 10 |
| Citronellol | 5 |
| Geraniol | 5 |
| Phenylethyl alcohol | 10 |
| Benzyl acetate | 5 |
| Hexyl cinnamic aldehye | 5 |
| Methyl ionone | 10 |
| Rose absolute | 2 |
| Jasmin absolute | 3 |
| Patchouli oil | 4 |
| Vetiver oil | 5 |
| Coumarin | 3 |
| Vanillin | 2 |
| Civet tink | 3 |
| Musk ambrette | 5 |
| Bicyclohumulenone | 8 |

-continued

| | Parts by weight |
|---|---|
| | 100 |

EXAMPLE 3

Perfume and fragrance composition of the chypre type

A chypre base was prepared according to the following formula:

| | Parts by weight |
|---|---|
| Bergamot oil | 15 |
| Geranium oil | 5 |
| Orange flower oil | 5 |
| Oak moss oil | 10 |
| Phenylethyl alcohol | 5 |

-continued

| | Parts by weight |
|---|---|
| Benzyl acetate | 5 |
| Linalool | 5 |
| Amyl salicylate | 4 |
| Methyl ionone | 5 |
| Rose base | 5 |
| Jasmin base | 5 |
| Vetiver oil | 3 |
| Sandalwood oil | 5 |
| Heliotropine | 3 |
| Opoponax oil | 2 |
| Amber tink | 2 |
| Musk ambrette | 5 |
| Bicyclohumulenone | 10 |
| | 100 |

What is claimed is:

1. A process for imparting an aromatic fragrance to a substrate material, which comrpises adding an olfactorily sensible amount of 1,5,8,8-tetramethylbicyclo[8.1.0]undec-5-en-2-one to the substrate material.

* * * * *